US008648786B2

(12) United States Patent
Lee et al.

(10) Patent No.: US 8,648,786 B2
(45) Date of Patent: Feb. 11, 2014

(54) LIQUID CRYSTAL DISPLAY DEVICE

(75) Inventors: Jae Kyun Lee, Gyeonggi-do (KR); Kum Mi Oh, Seoul (KR); Jae Young Oh, Seoul (KR); Dong Su Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1069 days.

(21) Appl. No.: 12/222,436

(22) Filed: Aug. 8, 2008

(65) Prior Publication Data

US 2009/0040166 A1 Feb. 12, 2009

(30) Foreign Application Priority Data

Aug. 9, 2007 (KR) .................. 10 2007-0080354
Aug. 9, 2007 (KR) .................. 10 2007-0080355

(51) Int. Cl.
*G09G 3/36* (2006.01)
*G02F 1/1333* (2006.01)
*G02F 1/136* (2006.01)

(52) U.S. Cl.
USPC ............. 345/98; 345/92; 349/54; 349/139; 349/150; 349/192

(58) Field of Classification Search
USPC ............ 345/92, 98; 349/54, 139, 150, 192
See application file for complete search history.

(56) References Cited

U.S. PATENT DOCUMENTS

| 6,392,626 | B1 * | 5/2002 | Moon | 345/94 |
| 7,436,480 | B2 * | 10/2008 | Kang et al. | 349/149 |
| 7,705,820 | B2 * | 4/2010 | Park | 345/100 |
| 7,796,105 | B2 * | 9/2010 | Moon | 345/87 |
| 2002/0044227 | A1 * | 4/2002 | Lee | 349/40 |
| 2003/0123009 | A1 * | 7/2003 | Jo et al. | 349/141 |
| 2003/0133066 | A1 | 7/2003 | Ono et al. | 349/141 |
| 2003/0214470 | A1 * | 11/2003 | Sun | 345/87 |
| 2003/0227590 | A1 | 12/2003 | Oke et al. | 349/141 |
| 2004/0196228 | A1 * | 10/2004 | Ahn | 345/87 |
| 2004/0239826 | A1 * | 12/2004 | Park et al. | 349/43 |
| 2005/0140400 | A1 * | 6/2005 | Yi et al. | 327/108 |

(Continued)

FOREIGN PATENT DOCUMENTS

| CN | 1432855 | 7/2003 |
| CN | 1847966 | 10/2006 |

(Continued)

OTHER PUBLICATIONS

KR Office Action issued Feb. 25, 2013 for counterpart Korean Appln. No. 10-2007-0080354.

(Continued)

*Primary Examiner* — William Boddie
*Assistant Examiner* — Alecia D English
(74) *Attorney, Agent, or Firm* — Morgan, Lewis & Bockius LLP

(57) ABSTRACT

A liquid crystal display device includes a display panel including a display area and a non-display area surrounding the display area, a plurality of gate lines and data lines arranged on the display area to intersect each other, so as to define a plurality of pixel regions, a plurality of thin-film transistors formed at respective intersections of the gate lines and the data lines, a plurality of pixel electrodes formed on the respective pixel regions and connected to the thin film transistors, and at least one first common line provided between the data lines and arranged parallel to the data lines.

19 Claims, 19 Drawing Sheets

(56) References Cited

U.S. PATENT DOCUMENTS

| | | |
|---|---|---|
| 2005/0211986 A1 | 9/2005 | Konno et al. |
| 2005/0253978 A1* | 11/2005 | Chae et al. ............. 349/43 |
| 2005/0270435 A1* | 12/2005 | Shiau et al. ............. 349/54 |
| 2006/0001789 A1 | 1/2006 | Ahn ............................. 349/42 |
| 2006/0001803 A1* | 1/2006 | Park ........................... 349/113 |
| 2006/0146247 A1* | 7/2006 | Kim ........................... 349/141 |
| 2007/0146241 A1* | 6/2007 | Fan ............................ 345/74.1 |
| 2007/0165171 A1* | 7/2007 | Lee ............................ 349/139 |
| 2008/0111962 A1* | 5/2008 | Lin et al. .................. 349/139 |
| 2009/0219457 A1* | 9/2009 | Seo et al. ................... 349/55 |

FOREIGN PATENT DOCUMENTS

| | | |
|---|---|---|
| KR | 1020040059321 A | 7/2004 |
| KR | 1020070042790 A | 4/2007 |
| TW | 2007-12709 | 9/2007 |

OTHER PUBLICATIONS

KR Office Action issued Feb. 25, 2013 for counterpart Koreaqn Appln. No. 10-2007-0080355.

\* cited by examiner

<Prior Art>

LIQUID CRYSTAL DISPLAY DEVICE

This application claims the benefit of Korean Patent Application No. P2007-080354 filed on Aug. 9, 2007, and Korean Patent Application No. P2007-080355 filed on Aug. 9, 2007, which are hereby incorporated by reference as if fully set forth herein.

BACKGROUND OF THE INVENTION

1. Field of the Invention

The present invention relates to a liquid crystal display device, and more particularly, to a liquid crystal display device with uniform common voltage distribution within a display panel to provide enhanced display quality.

2. Discussion of the Related Art

As a society of information technology grows, there is a demand for development of image display devices capable of solving drawbacks of conventional cathode ray tubes (CRTs), such as weight and volume thereof. Accordingly, a variety of flat panel display devices, including liquid crystal display (LCD) devices, organic light emitting diodes (OLEDs), plasma display panel (PDP) devices, surface-conduction electron-emitter display (SED) devices, and the like, have attracted considerable attention. Of the above-mentioned display devices, the most representative flat panel display device is the LCD device, which has been widely used as a large-scale TV screen to a small display screen of a mobile phone.

LCD devices are configured with a liquid crystal material, exhibiting dielectric anisotropy and refractive index anisotropy, arranged between two electrodes. Transmission of light is adjusted by controlling the strength of an electric field generated between the two electrodes to generate a desired display image. LCD devices are not self-illuminating type display devices (i.e., displays capable of emitting light by itself) but a light-receiving type display device designed to realize an image upon receiving light from a light source situated therein.

Generally, the LCD device receives white light from a light source situated therein and generates color images using color filters, such as red, green, and blue colors. In the above-described configuration of the LCD device, the two electrodes that drive liquid crystals in the liquid crystal material generally include a pixel electrode and a common electrode. These electrodes are connected to a thin film transistor with the pixel electrode receiving a voltage corresponding to an image signal and the common electrode receiving a common voltage. The liquid crystals are driven by an electric field generated between the two electrodes. However, the above-described conventional LCD device has the following problems.

A common line, which serves to supply a common voltage to a panel of the LCD device, is horizontally formed with only one or two input terminals to apply the common voltage to the common line. Therefore, achieving uniform distribution of the common voltage in a large-scale display panel becomes difficult due to resistance in the common line, for example. This deteriorates image quality, such as causing after-images, and the like. In particular, in the case of display panels used in televisions, the common lines have longer horizontal lengths than vertical lengths. Therefore, these panels suffer from an increased resistance in the common lines. Accordingly, there is a high likelihood of wire breakage and crosstalk.

SUMMARY OF THE INVENTION

Accordingly, the present invention is directed to liquid crystal display device that substantially obviates one or more problems due to limitations and disadvantages of the related art.

An object of the present invention is to provide a liquid crystal display device having uniform common voltage distribution within a liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a display panel including a display area and a non-display area surrounding the display area, a plurality of gate lines and data lines arranged on the display area to intersect each other, so as to define a plurality of pixel regions, a plurality of thin-film transistors formed at respective intersections of the gate lines and the data lines, a plurality of pixel electrodes formed on the respective pixel regions and connected to the thin film transistors, and at least one first common line provided between the data lines and arranged parallel to the data lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

First Embodiment

Figure 1:
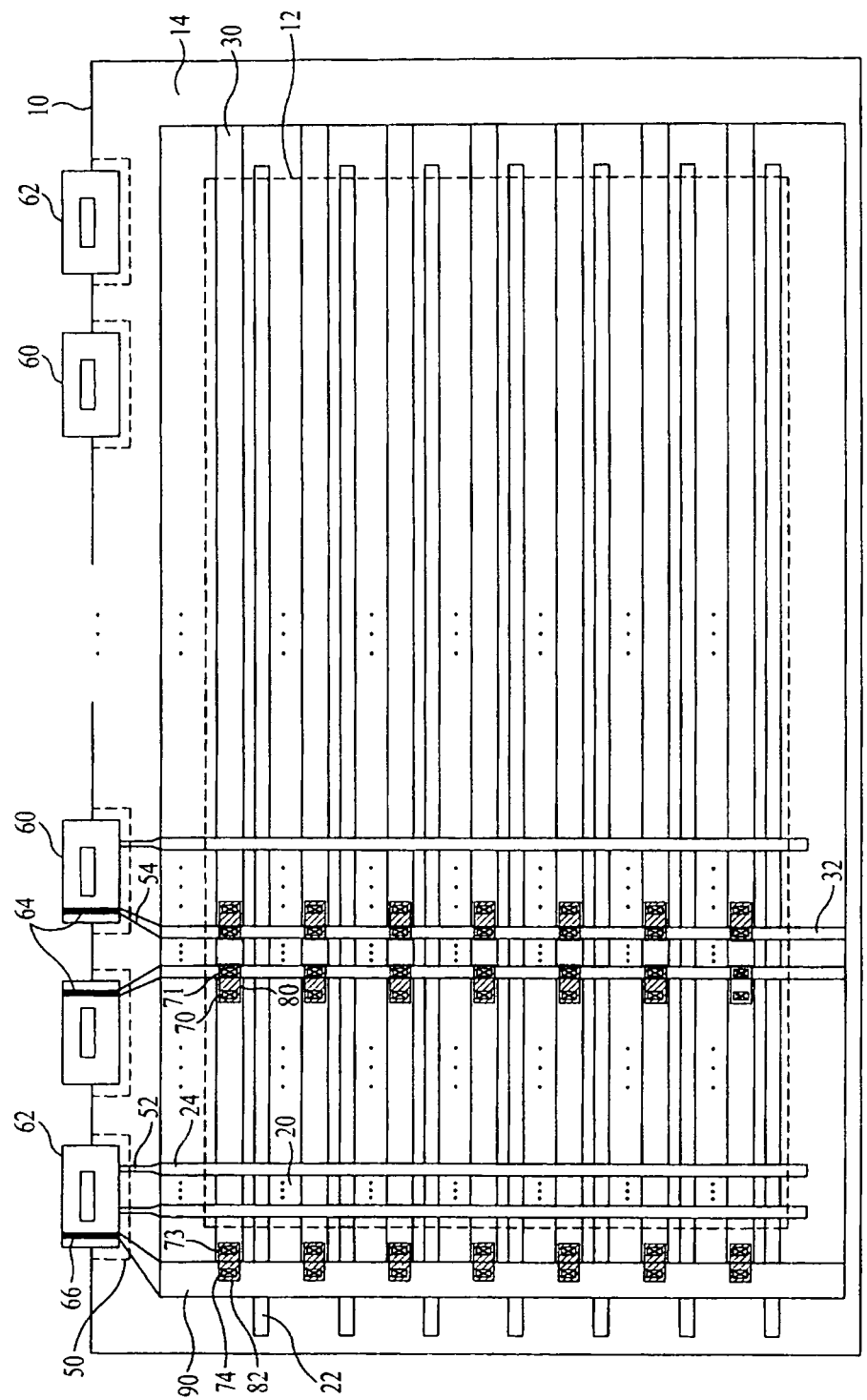
FIG. 1 is a plan view illustrating an exemplary liquid crystal display device according to a first embodiment of the present invention.
Figure 2:
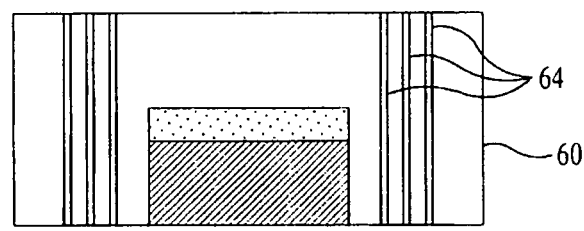
FIG. 2 is a plan view illustrating an exemplary data driver IC in accordance with the present invention.
Figure 3:
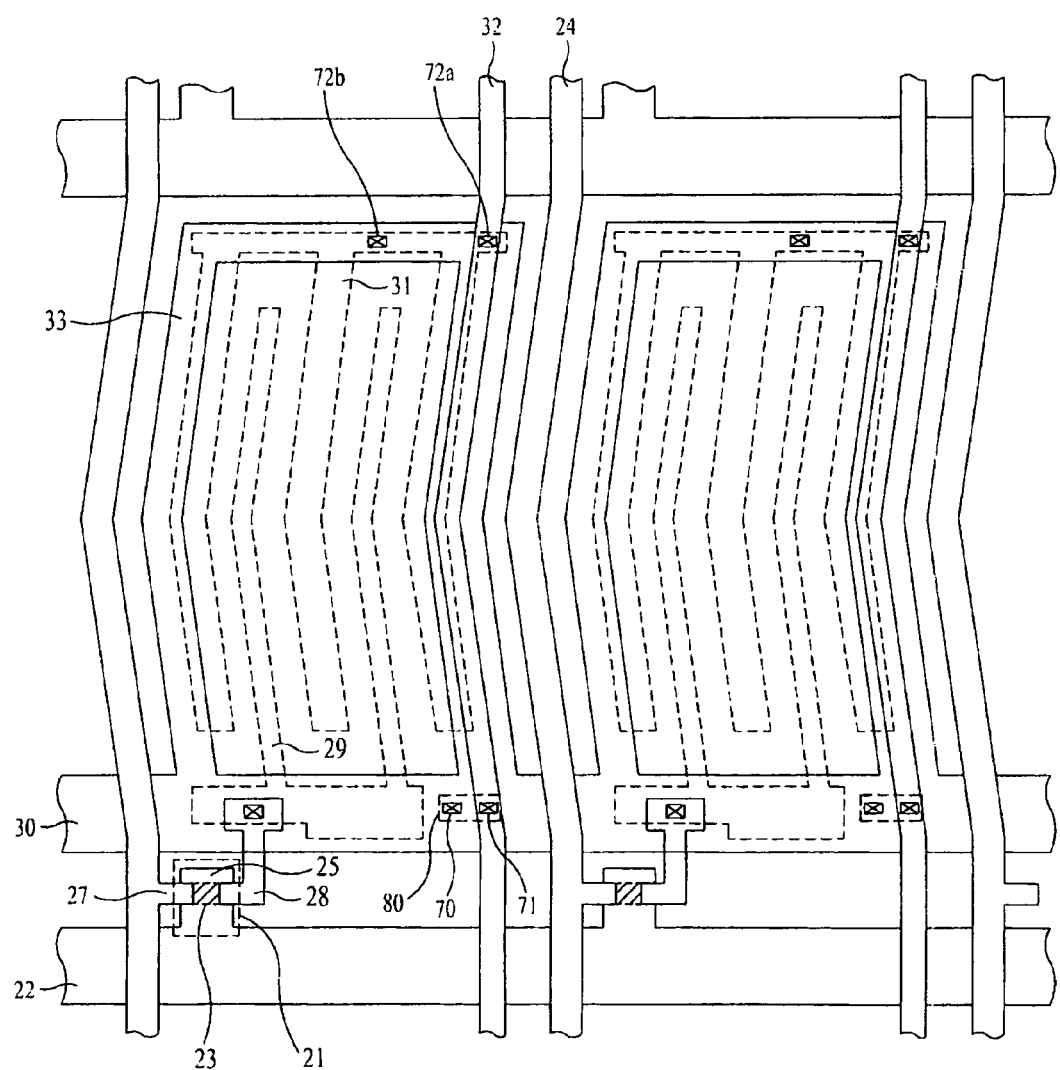
FIG. 3 is a plan view illustrating an exemplary in-plane switching mode liquid crystal display device according to the first embodiment of the present invention.

FIG. 1 is a plan view illustrating an exemplary liquid crystal display device according to a first embodiment of the present invention. FIG. 2 is a plan view illustrating an exemplary data driver integrated circuit (IC). FIG. 3 is a plan view illustrating an in-plane switching (IPS) mode liquid crystal display device according to the first embodiment of the present invention.

The liquid crystal display device according to the first embodiment of the present invention, as shown in FIG. 1, includes a display panel 10 having a display area 12 and a non-display area 14 surrounding the display area 12, a plurality of gate lines 22 and a plurality of data lines 24 formed in the display area 12 and arranged to intersect each other to thereby define a plurality of pixel regions 20, a plurality of thin film transistors 21 (FIG. 3) formed at respective intersections of the gate lines 22 and the data lines 24, a plurality of pixel electrodes 29 (FIG. 3) formed in the pixel regions and connected to the respective thin film transistors 21, a plurality of horizontal common lines 30 formed parallel to the respective gate lines 22, a plurality of vertical common lines 32 formed parallel to the respective data lines 24 and arranged to intersect the horizontal common lines 30, a plurality of data pad portions 50 formed in the non-display area 14 each constituting a collection of pad lines including data pad lines 52 and common pad lines 54, a plurality of first data driver ICs 60 connected to the respective data pad portions 50, and second data driver ICs 62 connected to data pad portions 50 at each end of the display panel 10. As shown in FIG. 2, at least one of the plurality of first data driver ICs 60 includes at least one first common voltage input terminal 64 to supply a common voltage to each vertical common line 32.

Generally, the display panel 10 includes two transparent substrates bonded to each other having a liquid crystal layer interposed therebetween. The plurality of data lines 24 and the plurality of gate lines 22 are arranged to cross each other with a gate insulating film (not shown) interposed therebetween to define the plurality of pixel regions 20. Scan signals are sequentially supplied to the display panel 10 through the gate lines 22, and data signals are supplied to the display panel 10 through the data lines 24. The plurality of pixel regions 20 is arranged in a matrix within the display area 12. Each pixel region 20, for example, may be adapted to correspond to any one of red, green, blue, and even white color to implement a color display.

As shown in FIG. 3, each thin-film transistor 21 includes a gate electrode 25 branched from an associated gate line 22, a semiconductor layer 23 is formed on top of each gate electrode 25, a source electrode 27 is formed on top of one end of the semiconductor layer 23 and branched from an associated data line 24, and a drain electrode 28 is formed on top of the opposite end of the semiconductor layer 23. Each pixel electrode 29 is formed on the pixel region 20 and connected to the drain electrode 28. Preferably, the pixel electrode 29 is made of, for example, a transparent conductive layer such as Indium Tin Oxide (ITO), Indium Zinc Oxide, or the like. The thin film transistor 21 is turned on/off by the scan signal supplied via the gate lines 22. If the thin film transistor 21 is turned on, the data signal is applied to the pixel electrodes 29 through the data lines 24.

The horizontal common lines 30 and the gate lines 22 are arranged in parallel and are formed of the same layer. The vertical common lines 32 and the data lines 24 are arranged in parallel and are formed of the same layer. The horizontal common lines 30 and the vertical common lines 32 are arranged to cross each other with the gate insulating film (not shown) being interposed therebetween. Common electrodes 31 are formed between the pixel electrodes 29. Both the common electrodes 31 and the pixel electrodes 29 are formed of the same layer.

The horizontal common lines 30 and the vertical common lines 32 are electrically connected to each other and are adapted to stably supply the common voltage to the entire liquid crystal display panel 10. Specifically, a common voltage supplied from an external source is applied to the common electrodes 31 in the liquid crystal display panel 10 via the horizontal common lines 30 and the vertical common lines 32. For example, the horizontal common lines 30 and the vertical common lines 32 are electrically connected to each other by first connecting patterns 80, each of which is patterned to cover both a first contact hole 70 exposing a part of the horizontal common line 30 and a second contact hole 71 exposing a part of the vertical common line 32. Preferably, the first connecting patterns 80 are formed of the same layer as the pixel electrode 29.

In an alternative embodiment, the horizontal common line 30 may not be electrically connected to vertical common line 32 such that the vertical common line 32 provides common voltage independently of the horizontal common line 30.

In the present exemplary embodiment, the horizontal common lines 30 and the vertical common lines 32 are connected to each other via the first connecting patterns 80 rather than being directly connected to each other to avoid the necessity of additional processing steps in the fabrication process. Generally, a protective film is formed over the entire surface of the display panel after the thin film transistors are formed. To electrically connect the thin film transistors to the pixel regions, contact holes are formed in the drain electrodes of the thin film transistors, and the pixel electrodes are formed so as to electrically connect the pixel electrodes to the drain electrodes through the contact holes. Accordingly, the first and second contact holes 70 and 71 are formed during the process of forming the contact holes in the drain electrodes, and the first connecting patterns 80 are formed during the process of patterning of the pixel electrodes. Therefore, no additional process steps are necessary.

The plurality of data pad portions 50 includes the plurality of data pad lines 52 connected at one end thereof to the data lines 24 to supply data signals to the data lines 24. The data pad portions 50 may further include the plurality of common pad lines 54 electrically connected at one end thereof to the vertical common lines 32 to supply the common voltage to the vertical common lines 32. All the data pad lines 52 and the common pad lines 54 are formed of the same layer as the data lines 24. Specifically, the vertical common lines 32 are integrally formed with the respective common pad lines 54, and the data pad lines 52 are integrally formed with the respective data lines 24.

The first data driver ICs 60 are mounted, respectively, on the plurality of data pad portions 50 between the second data driver ICs 62 with the second data driver ICs 62 being mounted on the data pad portions 50 at each end of the display panel 10. At least one of the first data driver ICs 60 has a first common voltage input terminal 64 to which a common voltage is applied. The first common voltage input terminal 64 is connected to the common pad line 54 to supply the common voltage to each vertical common line 32. Furthermore, at least one of the second data driver ICs 62 has a second common voltage input terminal 66 to also supply the common voltage. The second common voltage input terminal 66 is provided in the second data driver IC 62 such that it is connected to a horizontal common line connecting pattern 90. The horizontal common line connecting pattern 90 serves to electrically connect the plurality of horizontal common lines 30 with one another.

The horizontal common line connecting pattern 90, as shown in FIG. 1, may be provided at the left side of the liquid crystal display panel 10. Alternatively, the horizontal common line connecting patter 90 may be provided on the right side of the liquid crystal display panel 10. The horizontal common line connecting pattern 90 may be formed of the same layer as the data lines 24. In this case, the horizontal common line connecting pattern 90 is electrically connected to the horizontal common lines 30 by second connecting patterns 82, each of which is patterned to cover both a contact hole 73 exposing a part of the horizontal common line 30 and a contact hole 74 exposing a part of the horizontal common line connecting pattern 90. Preferably, the second connecting patterns 82 are formed of the same layer as the pixel electrodes 29. In yet another alternative embodiment, the horizontal common line connecting pattern 90 may be omitted altogether when the horizontal common lines 30 and the vertical common lines 32 are electrically connected to each other to provide a stable and uniform distribution of the common voltage.

As described above, the liquid crystal display device according to the first embodiment of the present invention supplies the common voltage via the vertical common lines 32 arranged parallel to the data lines 24 to provide a more uniform supply of the common voltage over the entire display panel 10.

In addition to, or in the alternative, the common electrodes 31 may be electrically connected to the horizontal common lines 30 via common line branches 33 extending from the horizontal common lines 30 to the pixel regions 20 via contact holes 72b. The common electrodes 31 may also be connected to the vertical common lines 32 via contact holes 72a. That is, the horizontal common lines 30 and the vertical common lines 32 may be electrically connected to each other via the common electrodes 31.

Second Embodiment

Figure 4:
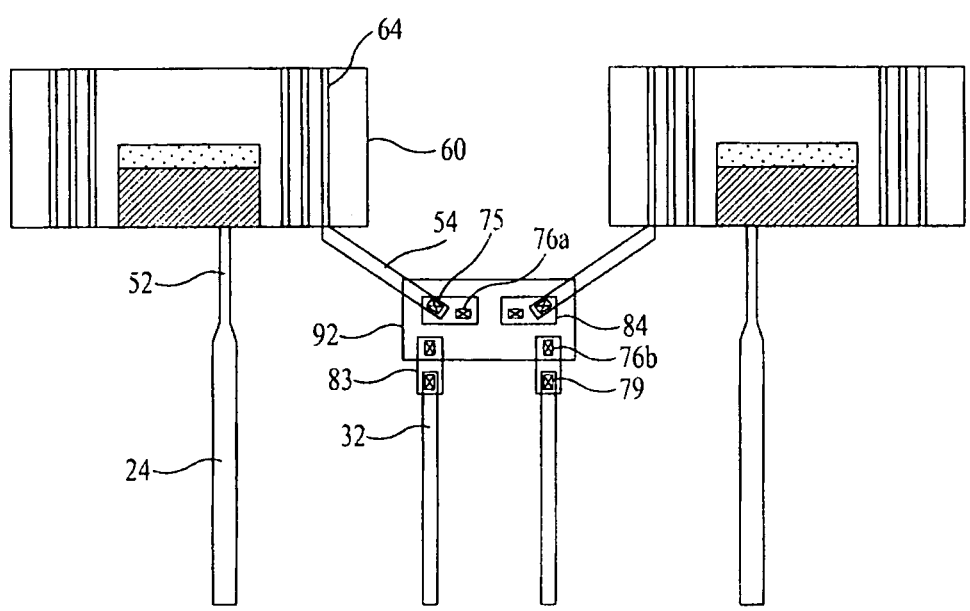
FIG. 4 is a plan view illustrating an exemplary liquid crystal display device according to a second embodiment of the present invention.

FIG. 4 is a plan view illustrating an exemplary liquid crystal display device according to a second embodiment of the present invention. In the first embodiment of the present invention, the common voltage supplied from an external source is applied to each of the vertical common lines 32 individually. Therefore, when the common voltage fluctuates, there is a likelihood of uneven supply of the common voltage.

Accordingly, in the second embodiment of the present invention, to assure uniform supply of the common voltage provided via the first common voltage input terminals 64 of neighboring data driver ICs 60, at least two neighboring vertical common lines 32 and at least two neighboring common pad lines 54 are connected to a vertical common line connecting pattern 92 having an island shape and formed in the non-display area 14 between the data pad portions 50 and the display area 12.

As shown in FIG. 4, the common pad lines 54 and the vertical common lines 32 are formed of the same layer as the data line 24, and the vertical common line connecting pattern 92 is formed of the same layer as the gate lines 22. A contact hole 79 exposing a part of the vertical common line 32 and a contact hole 76b exposing a part of the vertical common line connecting pattern 92 are formed. In addition, a contact hole 75 exposing a part of the common pad line 54 and a contact hole 76a exposing a part of the vertical common line connecting pattern 92 are formed. Thereafter, third and fourth connecting patterns 83 and 84 are formed over the contact holes 75, 76a, and 76b to connect the vertical common line 32, the vertical common line connecting pattern 92, and the common pad line 54 to one another.

Specifically, each vertical common line 32 and the vertical common line connecting pattern 92 are electrically connected to each other by the third connecting pattern 83 through the contact holes 79 and 76b. Each common pad line 54 and the vertical common line connecting pattern 92 are electrically connected to each other by the fourth connecting pattern 84 through the contact holes 75 and 76b.

In the present exemplary embodiment, the common pad line 54 and the vertical common line 32 are electrically connected to the vertical common line connecting pattern 92 via the connecting patterns 83 and 84 rather than being directly connected to each other to avoid the necessity of additional processing steps in the fabrication process. Generally, a protective film is formed over the entire surface of the display panel after the thin film transistors are formed. To electrically connect the thin film transistors to the pixel regions, contact holes are formed in the drain electrodes of the thin film transistors, and the pixel electrodes are formed so as to electrically connect the pixel electrodes to the drain electrodes through the contact holes. With this procedure, the contact holes are formed after formation of the data lines. To electrically connect the common pad lines 54 and the vertical common lines 32 to the vertical common line connecting pattern 92, the contact holes must be formed prior to forming the common pad line 54 and the vertical common line 32. Preferably, the third and fourth connecting patterns 83 and 84 are formed of the same layer as the pixel electrodes 29.

In the liquid crystal display device according to the second embodiment of the present invention as shown in FIG. 4, one vertical common line connecting pattern 92 is electrically connected to all the common pad lines 54 provided in the neighboring data pad portions 50. Accordingly, the first common voltage input terminals 64 provided in the respective neighboring data driver ICs 60 are electrically connected to the vertical common line connecting pattern 92.

The vertical common line connecting pattern 92 takes the form of an island arranged in a gap between neighboring data driver ICs 60. Therefore, the vertical common line connecting pattern 92 does not overlap adjacent data lines 24 to reduce a parasitic capacitance that may occur between the vertical common line connecting pattern 92 and the data lines 24, thereby preventing uneven common voltage distribution due to an RC delay phenomenon.

With the exception of the description above, the liquid crystal display device according to the second embodiment of the present invention are identical to that of the liquid crystal display device according to the first embodiment of the present invention and thus is not repeated.

Third Embodiment

Figure 5:
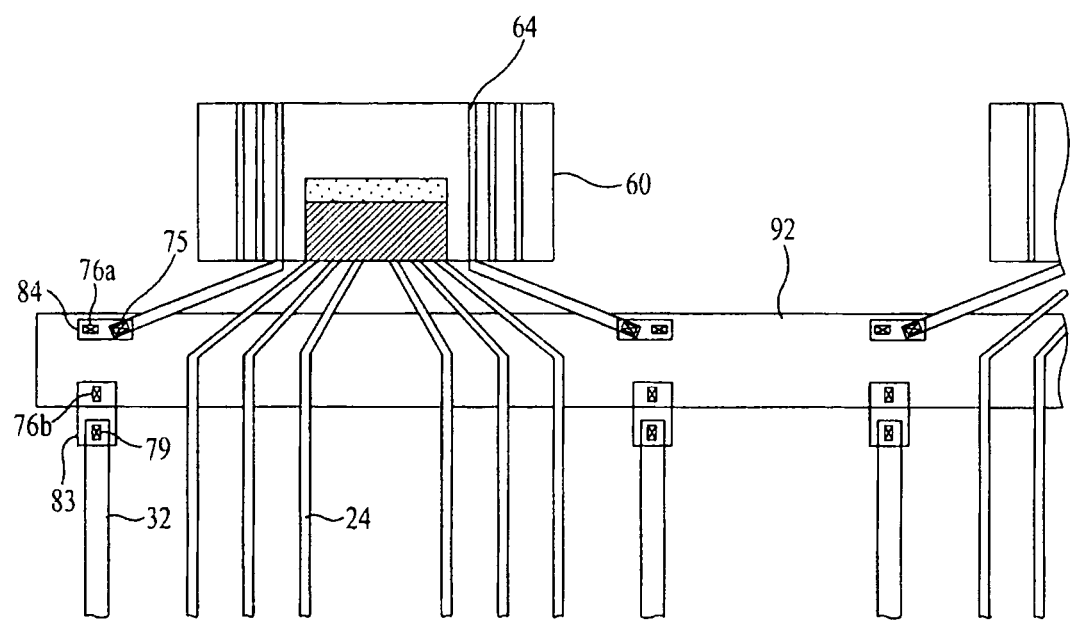
FIG. 5 is a plan view illustrating an exemplary liquid crystal display device according to a third embodiment of the present invention.
Figure 6:
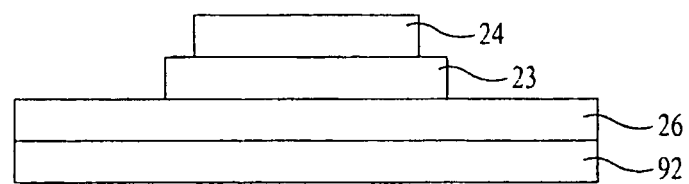
FIG. 6 is a sectional view of the liquid crystal display device according to the third embodiment of the present invention illustrating an exemplary region where a data line and a vertical common line connecting pattern overlap each other.
Figure 7:
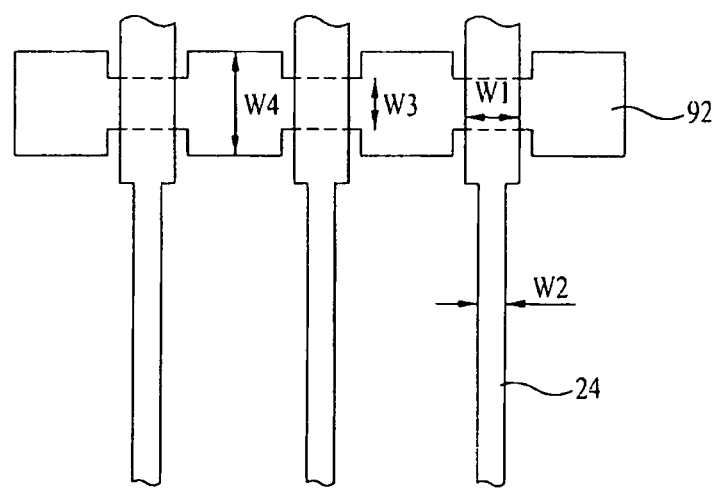
FIG. 7 is a plan view of the liquid crystal display device according to the third embodiment of the present invention illustrating exemplary line widths of overlapped portions of a data line and a vertical common line connecting pattern.

FIG. 5 is a plan view illustrating an exemplary liquid crystal display device according to a third embodiment of the present invention. FIG. 6 is a sectional view of the liquid crystal display device according to the third embodiment of the present invention illustrating a region where the data line and the vertical common line connecting pattern overlap each other. FIG. 7 is a plan view of the liquid crystal display device according to the third embodiment of the present invention illustrating line widths of overlapped portions of the data line and the vertical common line connecting pattern.

In the liquid crystal display device according to the third embodiment of the present invention as shown in FIG. 5, the vertical common line connecting pattern 92 is formed as an integral structure in the non-display area 14 between the data pad portions 50 and the display area 12. This arrangement has the effect of compensating for minute differences in the common voltage supplied via the respective first common voltage input terminals 64 and the second common voltage input terminals 66. With the exception of the descriptions set forth below, the liquid crystal display device according to the third embodiment of the present invention is identical to that of the liquid crystal display device according to the second embodiment of the present invention and thus is not repeated.

In the liquid crystal display device according to the third embodiment of the present invention as shown in FIG. 6, a region where the vertical common line connecting pattern 92 and the data line 24 overlap each other may be provided with a semiconductor layer 23 and a gate insulating film 26 interposed between the data line 24 and the vertical common line connecting pattern 92. If the semiconductor layer 23 is interposed between the data line 24 and the vertical common line connecting pattern 92, the semiconductor layer 23 serves as an insulator, whereby a parasitic capacitance between the vertical common line connecting pattern 92 to which the common voltage is supplied and the data line 24 to which the data signal is supplied may be reduced. Therefore, uneven common voltage distribution due to the delay phenomenon may be prevented.

As shown in FIG. 6, when the data line 24 and the semiconductor layer 23 are etched simultaneously, the semiconductor layer 23 results in having a larger width than the data line 24 according to a difference in etching rate. This has the effect of preventing wire breakage in the data line 24 due to rapid height variation. The semiconductor layer 23 is formed of the same layer as the semiconductor layer of the thin film transistor.

In the liquid crystal display device according to the third embodiment of the present invention as shown in FIG. 7, overlapped portions of the data line 24 and the vertical common line connecting pattern 92 may be formed to have different line widths from the remaining portions of the data line 24 and the vertical common line connecting pattern 92. This has the effect of preventing uneven common voltage distribution due to the delay phenomenon. Specifically, portions of the data line 24 overlapped with the vertical common line connecting pattern 92 may be formed to have a width W1 greater than a width W2 of the remaining portions of the data line 24. Similarly, portions of the vertical common line connecting portion 92 overlapped with the data line 24 may be formed to have a width W3 smaller than a width W4 of the remaining portion of the vertical common line connecting portion 92. With this configuration, line resistance in the data line 24 is reduced and consequently, parasitic capacitance between the data lines 24 and the vertical common line connecting pattern 92 is reduced, whereby uneven common voltage distribution due to the delay phenomenon may be substantially prevented.

Fourth Embodiment

Figure 8:
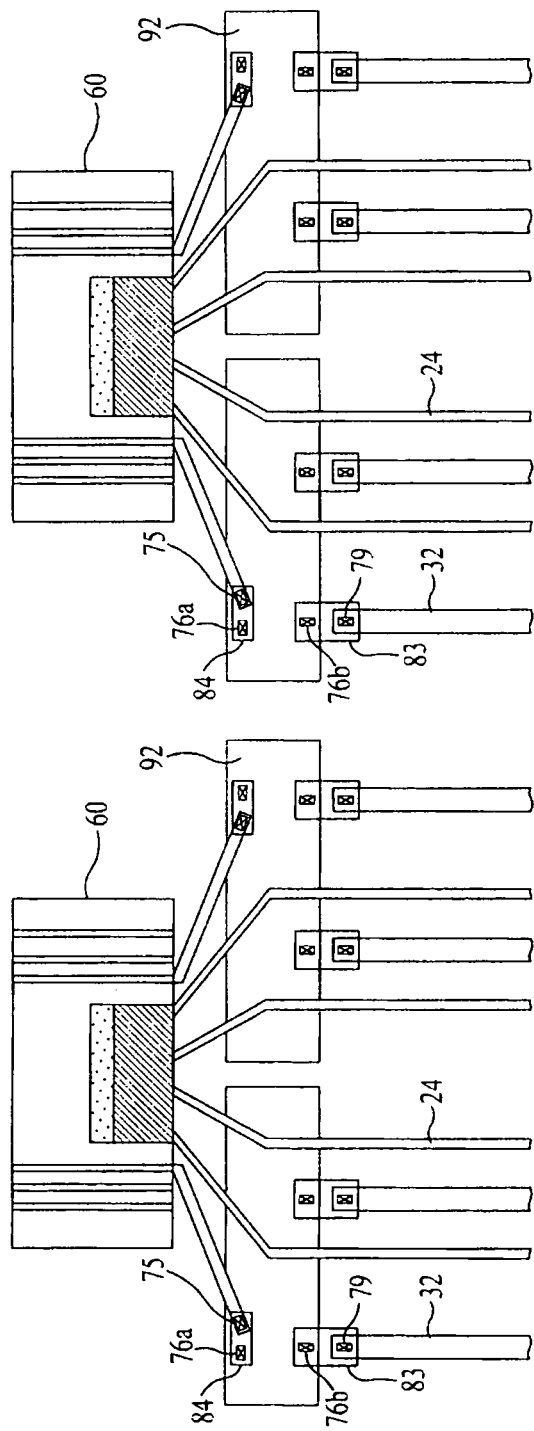
FIG. 8 is a plan view illustrating an exemplary liquid crystal display device according to a fourth embodiment of the present invention.
Figure 9:
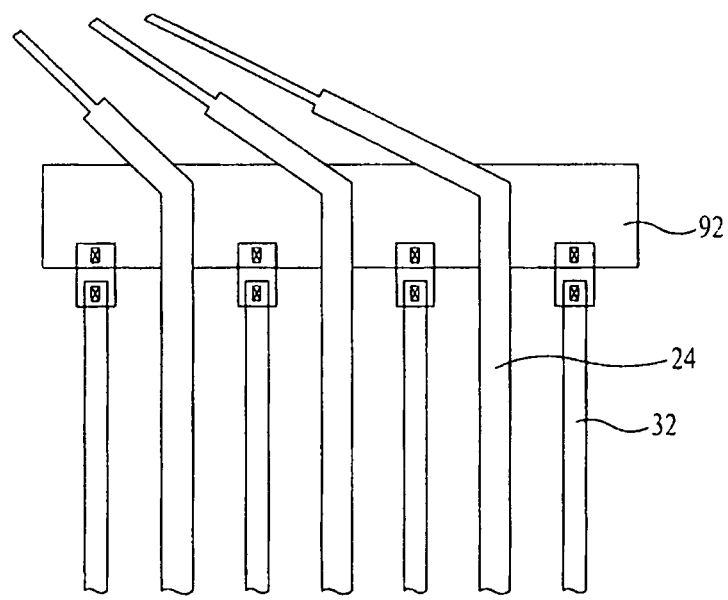
FIG. 9 is an enlarged plan view of the liquid crystal display device according to the fourth embodiment of the present invention.

FIG. 8 is a plan view illustrating an exemplary liquid crystal display device according to a fourth embodiment of the present invention. FIG. 9 is an enlarged plan view of the liquid crystal display device according to the fourth embodiment of the present invention.

The liquid crystal display device according to the fourth embodiment of the present invention as shown in FIG. 8, includes a plurality of the vertical common line connecting patterns 92 arranged to be separated from one another such that the common voltage from each first data driver IC 60 may be supplied individually to the vertical common lines 32. Specifically, a vertical common line connecting patterns 92 may be connected individually to each of the first common voltage input terminal 64 of a single data driver IC 60. Individual input of the common voltage as described above allows for more efficient circuit tuning.

In the liquid crystal display device according to the fourth embodiment of the present invention as shown in FIG. 9, the vertical common lines 32 and the data lines 24 may be alternately arranged. Such alternate arrangement of the data lines 24 and the vertical common lines 32 has the effect of producing a symmetrical electric field within the display panel 10. Accordingly, the entire pattern is symmetrical and thus, the electric field may be more uniformly distributed throughout the display panel.

With the exception of the description above, the liquid crystal display device according to the fourth embodiment of the present invention are identical to that of the liquid crystal display device according to the third embodiment of the present invention and thus is not repeated.

Fifth Embodiment

Figure 10:
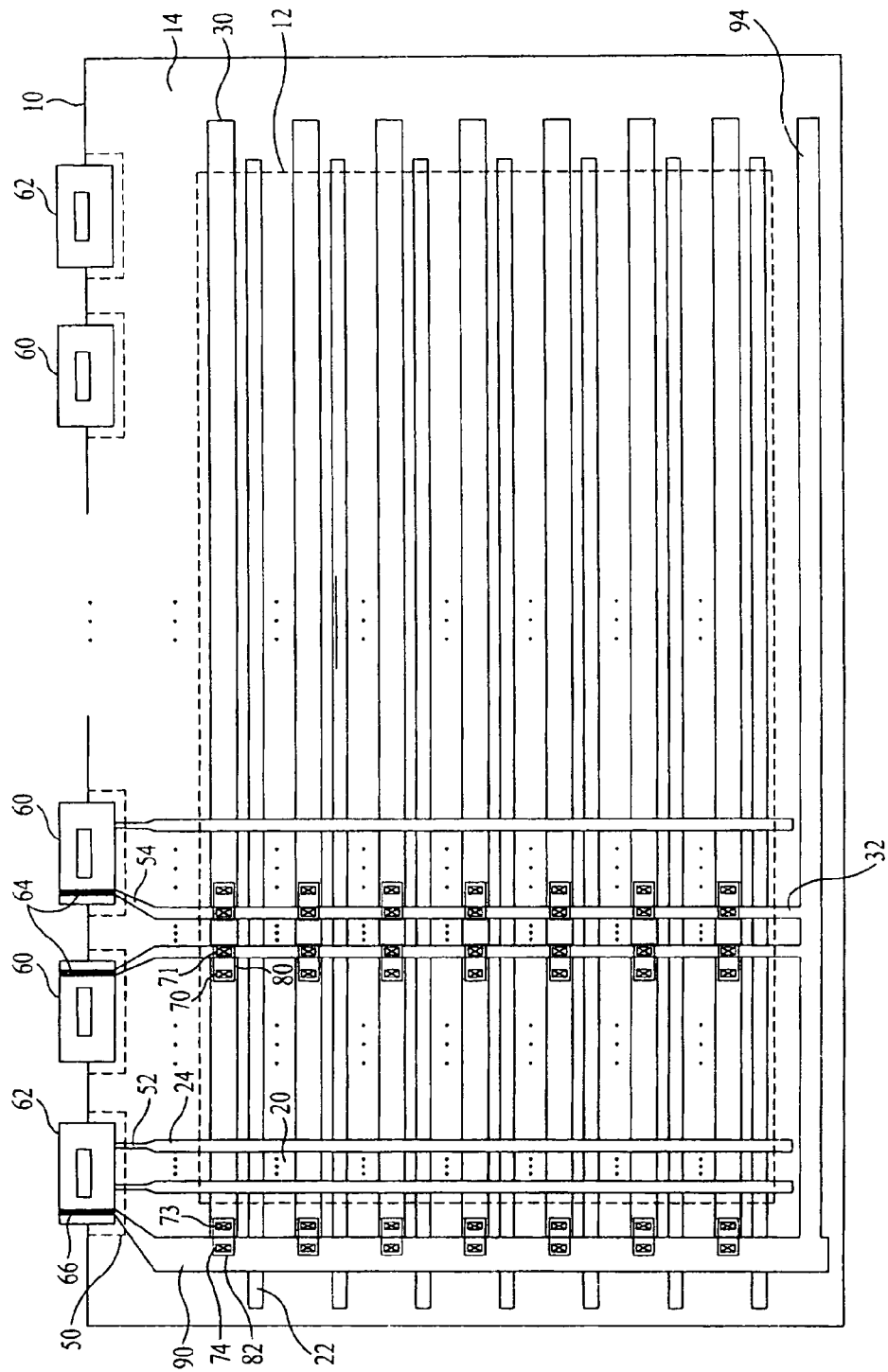
FIG. 10 is a plan view illustrating an exemplary liquid crystal display device according to a fifth embodiment of the present invention.

FIG. 10 is a plan view illustrating an exemplary liquid crystal display device according to a fifth embodiment of the present invention. The liquid crystal display device according to the fifth embodiment of the present invention, as shown in FIG. 10, further includes a bridge common line connecting pattern 94 formed in the non-display area 14 at an opposite side of the data pad portions 50 and is used to electrically connect the vertical common lines 32 to one another. Accordingly, more uniform common voltage distribution within the display panel may be accomplished.

Preferably, the bridge common line connecting pattern 94 is formed of the same layer as the vertical common lines 32. That is, both the bridge common line connecting pattern 94 and the vertical common lines 32 are formed of the same line as the data lines 24. Furthermore, the present embodiment may be combined with any of the second to fourth embodiments described above to achieve a uniform distribution of the common voltage within the display panel.

Sixth Embodiment

Figure 11:
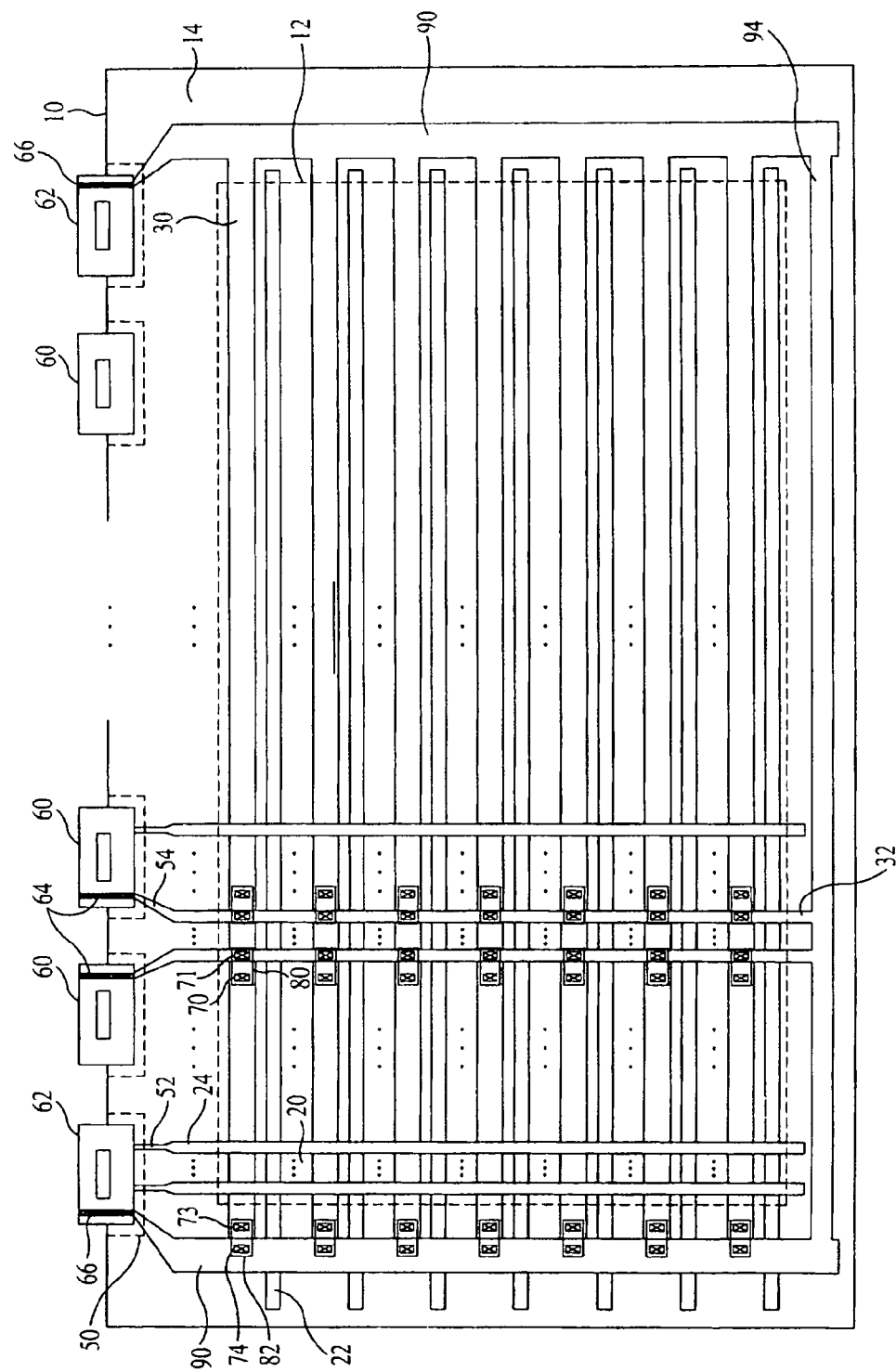
FIG. 11 is a plan view illustrating an exemplary liquid crystal display device according to a sixth embodiment of the present invention.

FIG. 11 is a plan view illustrating an exemplary liquid crystal display device according to a sixth embodiment of the present invention. As shown in FIG. 11, the liquid crystal display device according to the sixth embodiment of the present invention includes the bridge common line connecting pattern 94 formed in the non-display area 14 at the opposite side of the data pad portions 50 and a pair of the horizontal common line connecting patterns 90 formed at left and right sides of the display panel 10. Provision of both the bridge common line connecting pattern 94 and a pair of the horizontal common line connecting patterns 90 accomplishes more uniform common voltage distribution. Furthermore, the present embodiment may be combined with any of the second to fourth embodiments described above to achieve a uniform distribution of the common voltage within the display panel.

Figure 12:
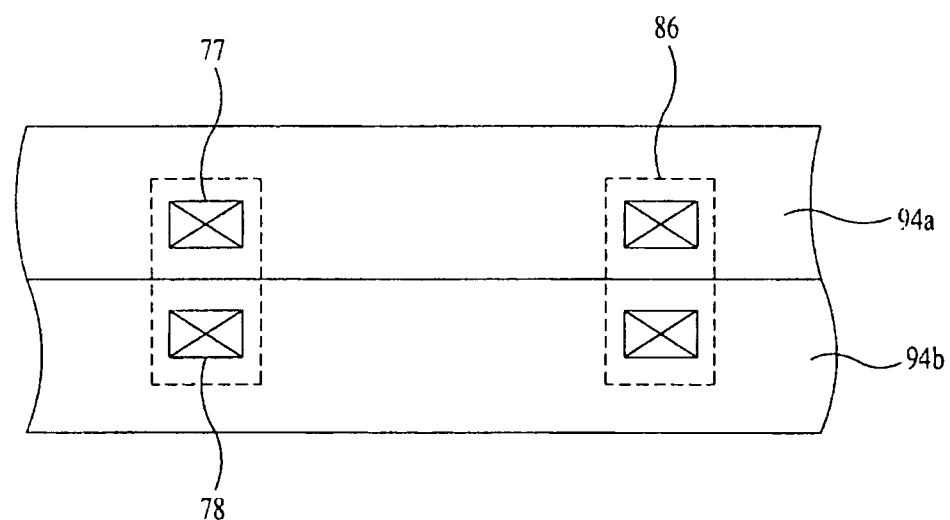
FIG. 12 is a plan view illustrating an exemplary dual layer configuration of a third common line connecting pattern in the liquid crystal display devices according to the fifth and sixth embodiments of the present invention.

FIG. 12 illustrates a dual layer configuration of the bridge common line connecting pattern 94 that may be used in the fifth and sixth embodiments described above. The bridge common line connecting pattern 94, as shown in FIG. 12, may have a dual layer configuration including of a first pattern 94a formed of the same layer as the data lines 24 and a second pattern 94b formed of the same layer as the gate lines 22. Although not shown, a protective insulating film is interposed between the first pattern 94a and the second pattern 94b.

The first pattern 94a and the second pattern 94b are electrically connected to each other by a fifth connecting pattern 86, which is patterned to cover a contact hole 77 exposing a part of the first pattern 94a and a contact hole 78 exposing a part of the second pattern 94b. The fifth connecting pattern 86 may be formed of the same layer as the pixel electrode 29. A plurality of the contact holes 77 and 78 and a plurality of the fifth connecting patterns 86 may be provided to obtain a multi-contact structure. The dual layer configuration of the bridge common line connecting pattern 94 as shown in FIG. 12 causes a further reduction in resistance, resulting in more uniform common voltage distribution.

Seventh Embodiment

Figure 13:
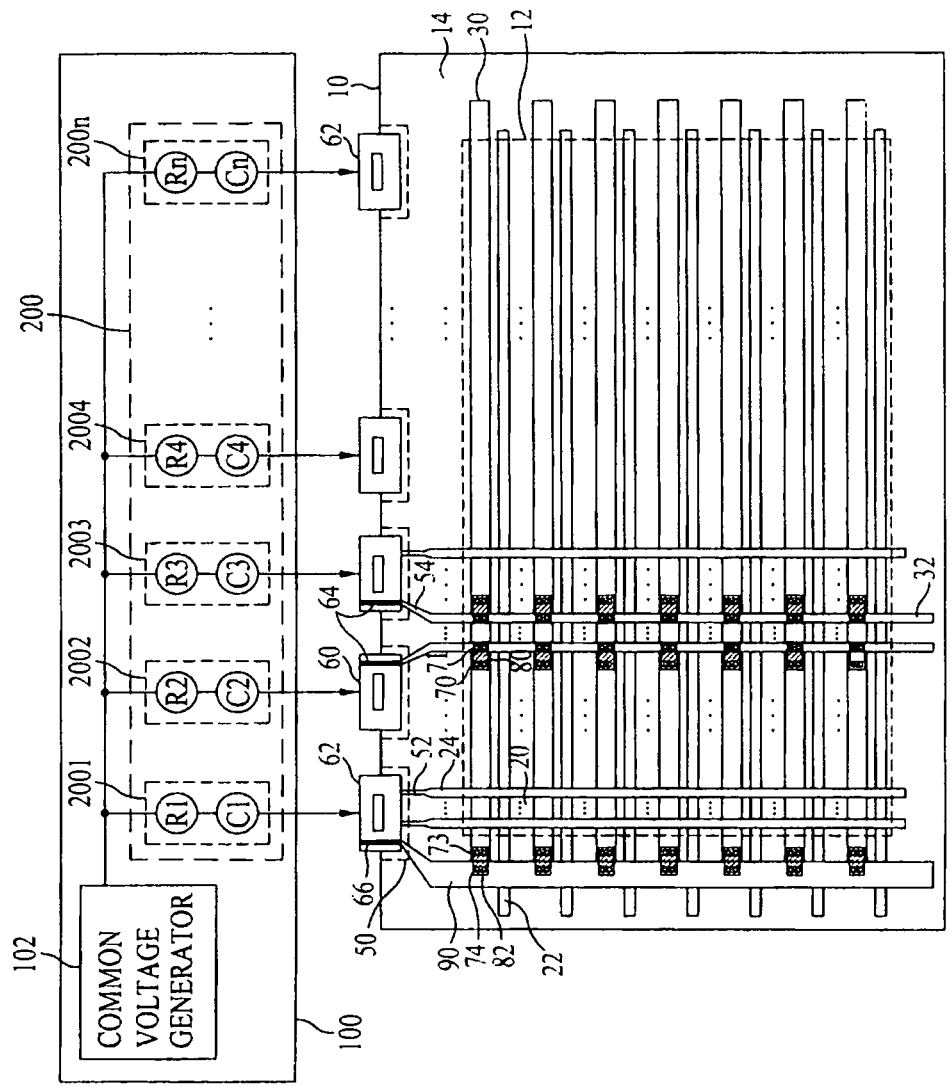
FIG. 13 is a plan view illustrating an exemplary liquid crystal display device according to a seventh embodiment of the present invention.

FIG. 13 is a plan view illustrating an exemplary configuration of a liquid crystal display device according to a seventh embodiment of the present invention. As shown in FIG. 13, the liquid crystal display device according to the seventh embodiment of the present invention, as compared to the previously described liquid crystal display device according to the first embodiment of the present invention shown in FIG. 1, further includes an external common voltage source 100 including a common voltage generator 102 to generate a common voltage and a common voltage delay restrictor 200 to prevent a common voltage delay phenomenon. Other configurations of the present embodiment are identical to those of the first embodiment and thus, the following description focuses upon the common voltage generator 102 and the common voltage delay restrictor 200.

The common voltage generator 102 and the common voltage delay restrictor 200 may be mounted on a printed circuit board (PCB). The common voltage delay restrictor 200 includes a plurality of delay preventing patterns $200_1$ to $200_n$ to prevent the common voltage delay phenomenon. The plurality of delay preventing patterns $200_1$ to $200_n$ correspond to the first and second data driver ICs 60 and 62, respectively. For example, there are provided the first to nth delay preventing patterns $200_1$ to $200_n$. The first to nth delay preventing patterns $200_1$ to $200_n$ individually controlling the common voltage, generated on the basis of a common voltage delay rate, supplied to the respective first and second data driver ICs 60 and 62. More specifically, the first to nth delay preventing patterns $200_1$ to $200_n$ control the common voltage in consideration of a signal delay rate depending on an increased area of the display panel 10 or a signal delay rate depending on an increased length of supply lines connected to the common voltage generator 102. The first to nth delay preventing patterns $200_1$ to $200_n$ include resistors R1 and Rn and capacitors C1 to Cn, respectively. Namely, the delay rate can be adjusted according to values of the resistors R1 to Rn and the capacitors C1 to Cn included in the respective first to nth delay preventing patterns $200_1$ to $200_n$.

More specifically, the values of the resistors R1 to Rn and the capacitors C1 to Cn provided in the first to nth delay preventing patterns $200_1$ to $200_n$ must decrease from the first delay preventing pattern $200_1$ toward the nth delay preventing pattern $200_n$. In other words, the values of the resistors R1 to Rn and the capacitors C1 to Cn provided in the first to nth delay preventing patterns $200_1$ to $200_n$ decrease as a common voltage delay rate increases. This relationship is represented by the following equation:

$$R1C1 > R2C2 > R3C3 > RnCn \qquad \text{(Equation 1)}$$

Values of the resistors R1 to Rn and the capacitors C1 to Cn of the respective first to nth delay preventing patterns $200_1$ to $200_n$ are calculated using the above Equation 1. Accordingly, the first to nth delay preventing patterns $200_1$ to $200_n$ can individually control the common voltage depending on the common voltage delay rate to the first and second data driver ICs 60 and 62, thereby supplying a uniform common voltage to the display panel 10.

Eighth Embodiment

Figure 14:
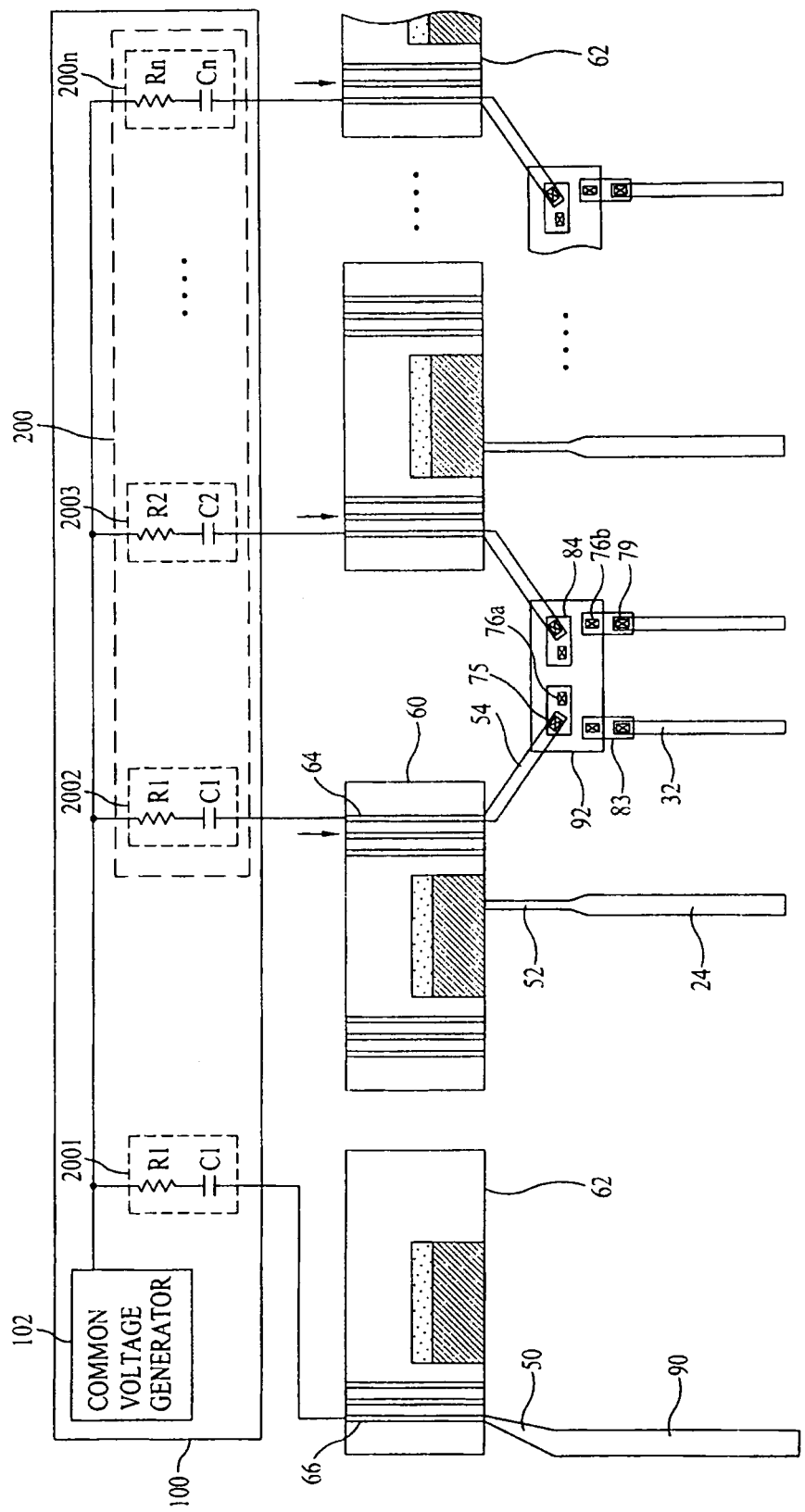
FIG. 14 is a plan view illustrating an exemplary liquid crystal display device according to an eighth embodiment of the present invention.

FIG. 14 is a plan view illustrating an exemplary liquid crystal display device according to an eighth embodiment of the present invention. As shown in FIG. 14, the liquid crystal display device according to the eighth embodiment of the present invention, as compared to the previously described liquid crystal display device according to the second embodiment of the present invention shown in FIG. 4, further includes an external common voltage source 100 including a common voltage generator 102 to generate a common voltage and a common voltage delay restrictor 200 to prevent a common voltage delay phenomenon. Other configurations of the present embodiment are identical to those of the second embodiment and thus, the following description focuses upon the common voltage generator 102 and the common voltage delay restrictor 200.

The common voltage delay restrictor 200 includes a plurality of delay preventing patterns $200_1$ to $200_n$. For example, there are provided the first to nth delay preventing patterns $200_1$ to $200_n$. The first to nth delay preventing patterns $200_1$ to $200_n$ are connected individually to the first and second data driver ICs 60 and 62 to control the common voltage supplied to the respective first and second data driver ICs 60 and 62.

Alternatively, because the at least two neighboring second common lines 32 are electrically connected to each other via the second common line connecting pattern 92, only one of the delay preventing patterns $200_1$ to $200_n$ may be connected to the second common line connecting pattern 92 for each pair of the at least two neighboring second common lines 32 to provide a stable and uniform common voltage.

Ninth Embodiment

Figure 15:
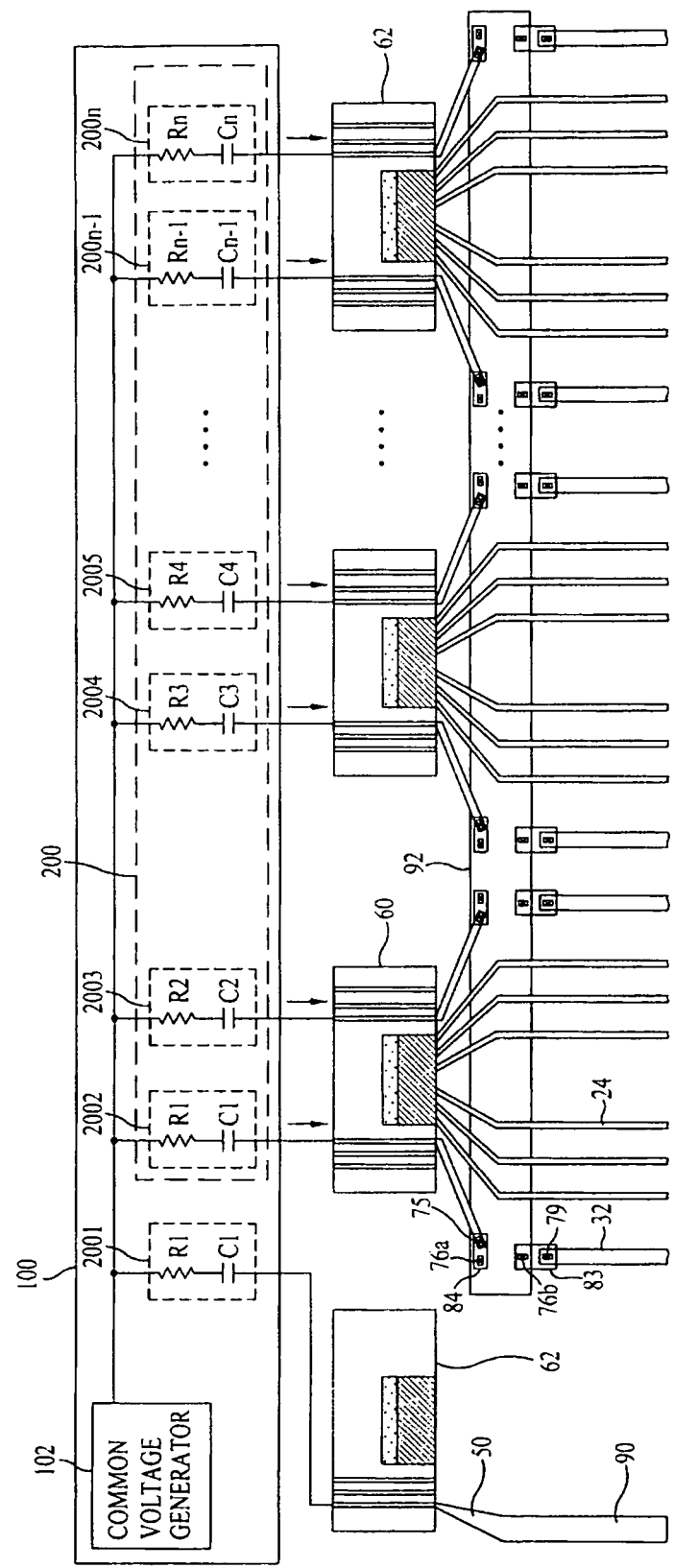
FIG. 15 is a plan view illustrating an exemplary liquid crystal display device according to a ninth embodiment of the present invention.

FIG. 15 is a plan view illustrating an exemplary liquid crystal display device according to a ninth embodiment of the present invention. As shown in FIG. 15, the liquid crystal display device according to the ninth embodiment of the present invention, as compared to the previously described liquid crystal display device according to the third embodiment of the present invention shown in FIG. 5, further includes an external common voltage source 100 including a common voltage generator 102 to generate a common voltage and a common voltage delay restrictor 200 to prevent a common voltage delay phenomenon. Other configurations of the present embodiment are identical to those of the third embodiment and thus, the following description focuses upon the common voltage generator 102 and the common voltage delay restrictor 200.

The common voltage delay restrictor 200 includes a plurality of delay preventing patterns $200_1$ to $200_n$. For example, there are provided the first to nth delay preventing patterns $200_1$ to $200_n$. At least one of the plurality of delay preventing patterns $200_1$ to $200_n$ is connected to the respective first and second data driver ICs 60 and 62 to control the common voltage supplied to the respective data driver ICs 60 and 62.

Alternatively, because all of the vertical common lines 32 are electrically connected to each other via the second common line connecting pattern 92, only one of the delay preventing patterns $200_1$ to $200_n$ may be connected to the second common line connecting pattern 92 to provide a stable and uniform common voltage. However, additional number of delay preventing patterns $200_1$ to $200_n$ may be connected to the second common line connecting pattern 92 without departing from the scope of the invention.

Tenth Embodiment

Figure 16:
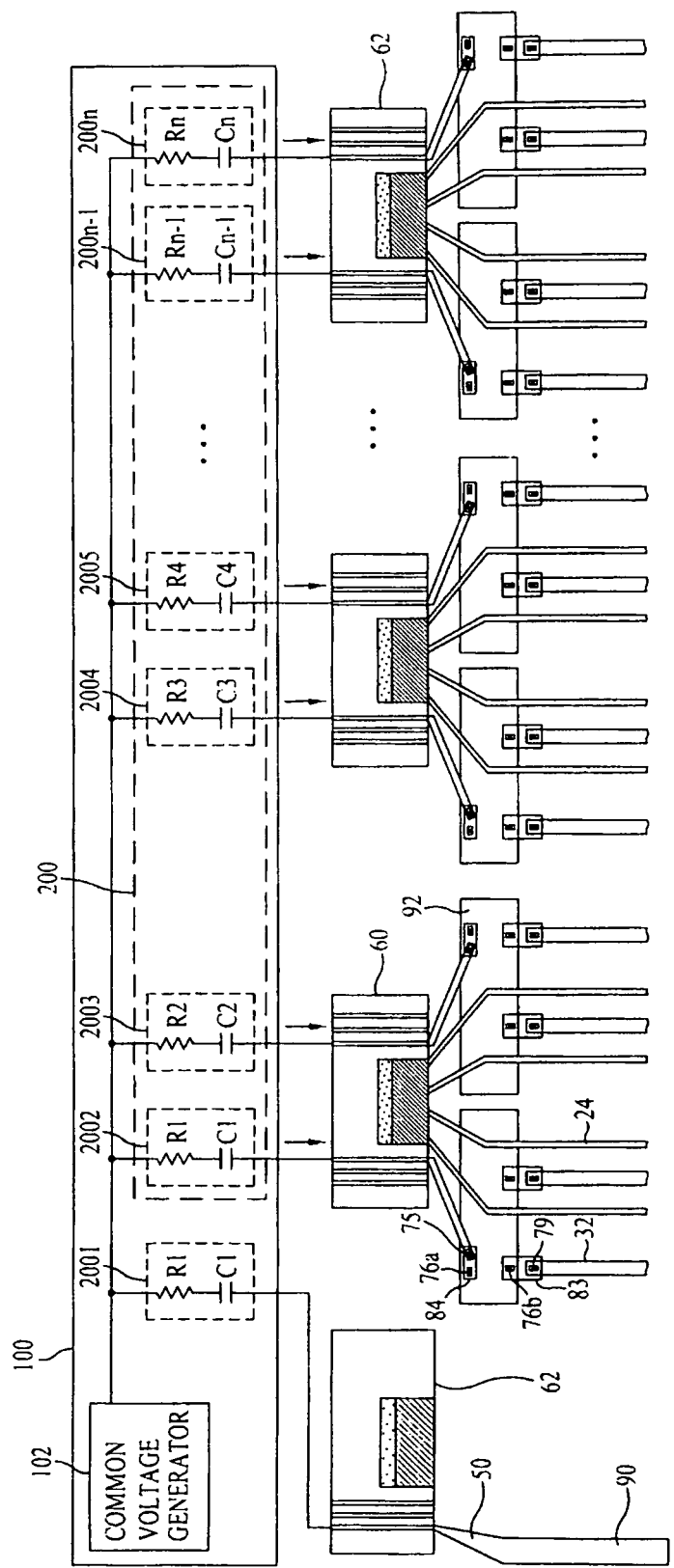
FIG. 16 is a plan view illustrating an exemplary liquid crystal display device according to a tenth embodiment of the present invention.

FIG. 16 is a plan view illustrating an exemplary liquid crystal display device according to a tenth embodiment of the present invention. As shown in FIG. 16, the liquid crystal display device according to the tenth embodiment of the present invention, as compared to the previously described liquid crystal display device according to the fourth embodiment of the present invention shown in FIG. 8, further includes an external common voltage source 100 including a common voltage generator 102 to generate a common voltage and a common voltage delay restrictor 200 to prevent a common voltage delay phenomenon. Other configurations of the present embodiment are identical to those of the fourth embodiment and thus, the following description focuses upon the common voltage generator 102 and the common voltage delay restrictor 200.

The common voltage delay restrictor 200 includes the plurality of delay preventing patterns $200_1$ to $200_n$. For example, there are provided the first to nth delay preventing patterns $200_1$ to $200_n$. At least one of the plurality of delay preventing patterns $200_1$ to $200_n$ is connected to the respective first and second data driver ICs 60 and 62 to control the common voltage supplied to the respective data driver ICs 60 and 62.

Eleventh Embodiment

Figure 17:
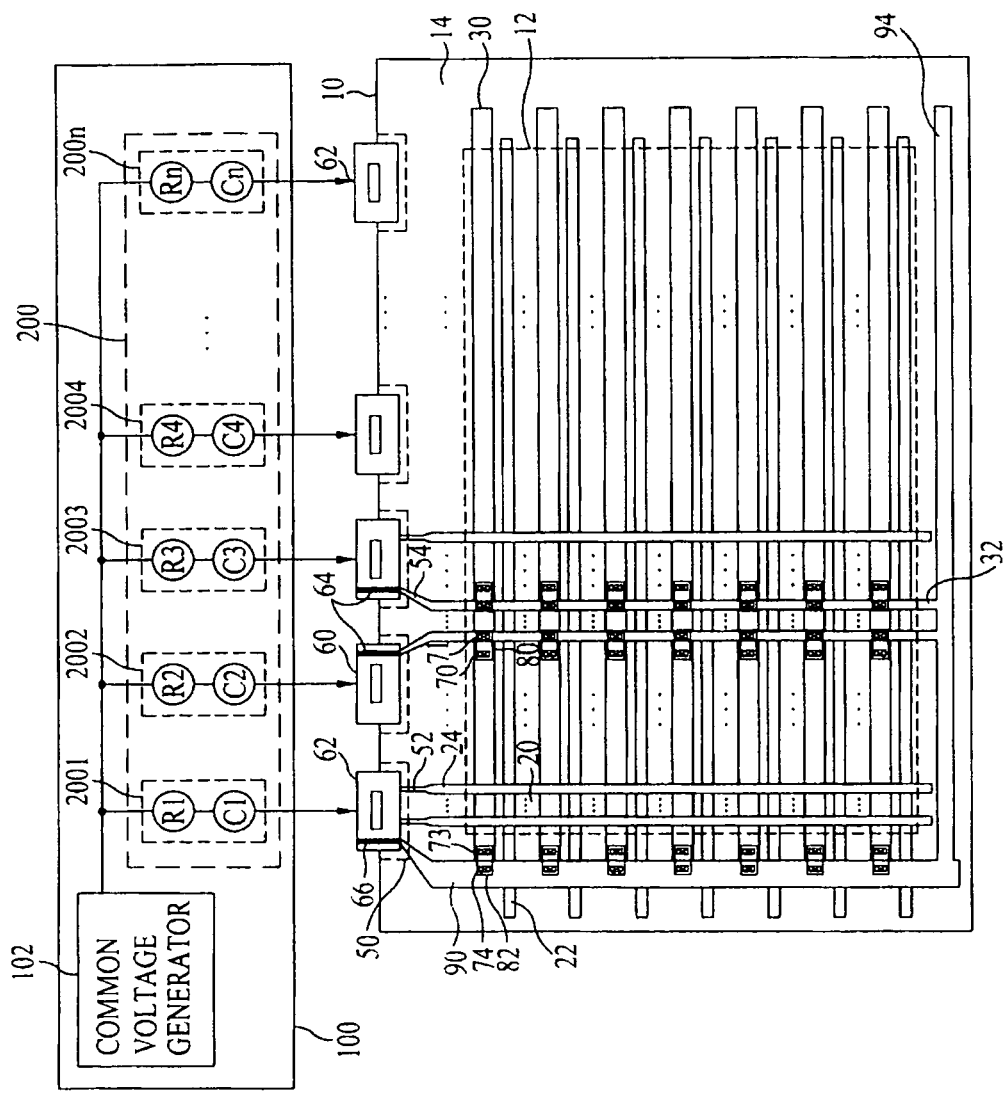
FIG. 17 is a plan view illustrating an exemplary liquid crystal display device according to an eleventh embodiment of the present invention.

FIG. 17 is a plan view illustrating an exemplary liquid crystal display device according to an eleventh embodiment of the present invention. As shown in FIG. 17, the liquid crystal display device according to the eleventh embodiment of the present invention, as compared to the previously described liquid crystal display device according to the fifth embodiment of the present invention shown in FIG. 10, further includes the common voltage generator 102 to generate a common voltage and the common voltage delay restrictor 200 to prevent a common voltage delay phenomenon. Other configurations of the present embodiment are identical to those of the fifth embodiment and the common voltage delay restrictor 200 is identical to that of FIG. 13.

Twelfth Embodiment

Figure 18:
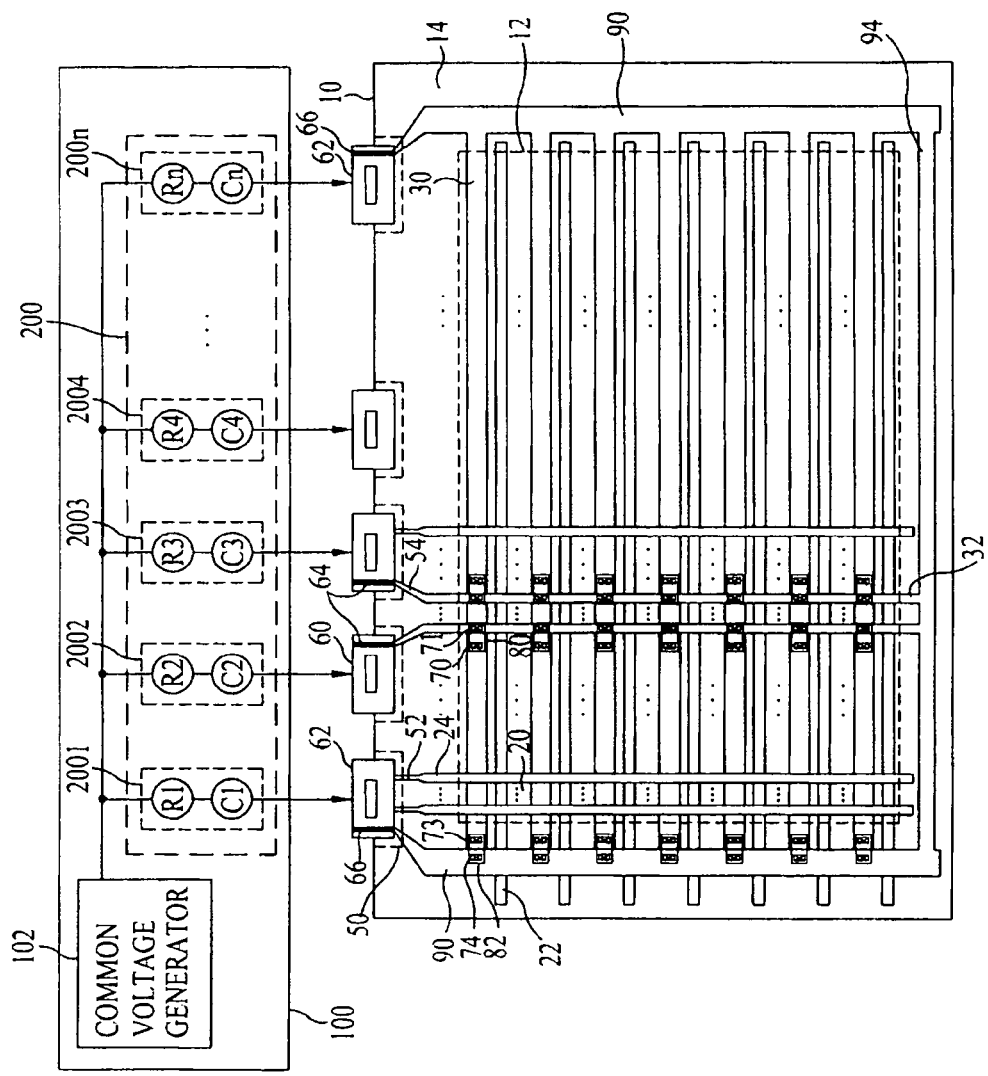
FIG. 18 is a plan view illustrating an exemplary liquid crystal display device according to a twelfth embodiment of the present invention.

FIG. 18 is a plan view illustrating an exemplary liquid crystal display device according to a twelfth embodiment of the present invention. As shown in FIG. 18, the liquid crystal display device according to the twelfth embodiment of the present invention, as compared to the previously described liquid crystal display device according to the sixth embodiment of the present invention shown in FIG. 11, further includes an external common voltage source 100 including a common voltage generator 102 to generate a common voltage and a common voltage delay restrictor 200 to prevent a common voltage delay phenomenon. Other configurations of the present embodiment are identical to those of the sixth embodiment and the common voltage delay restrictor 200 is identical to that of FIG. 13.

Thirteenth Embodiment

Figure 19:
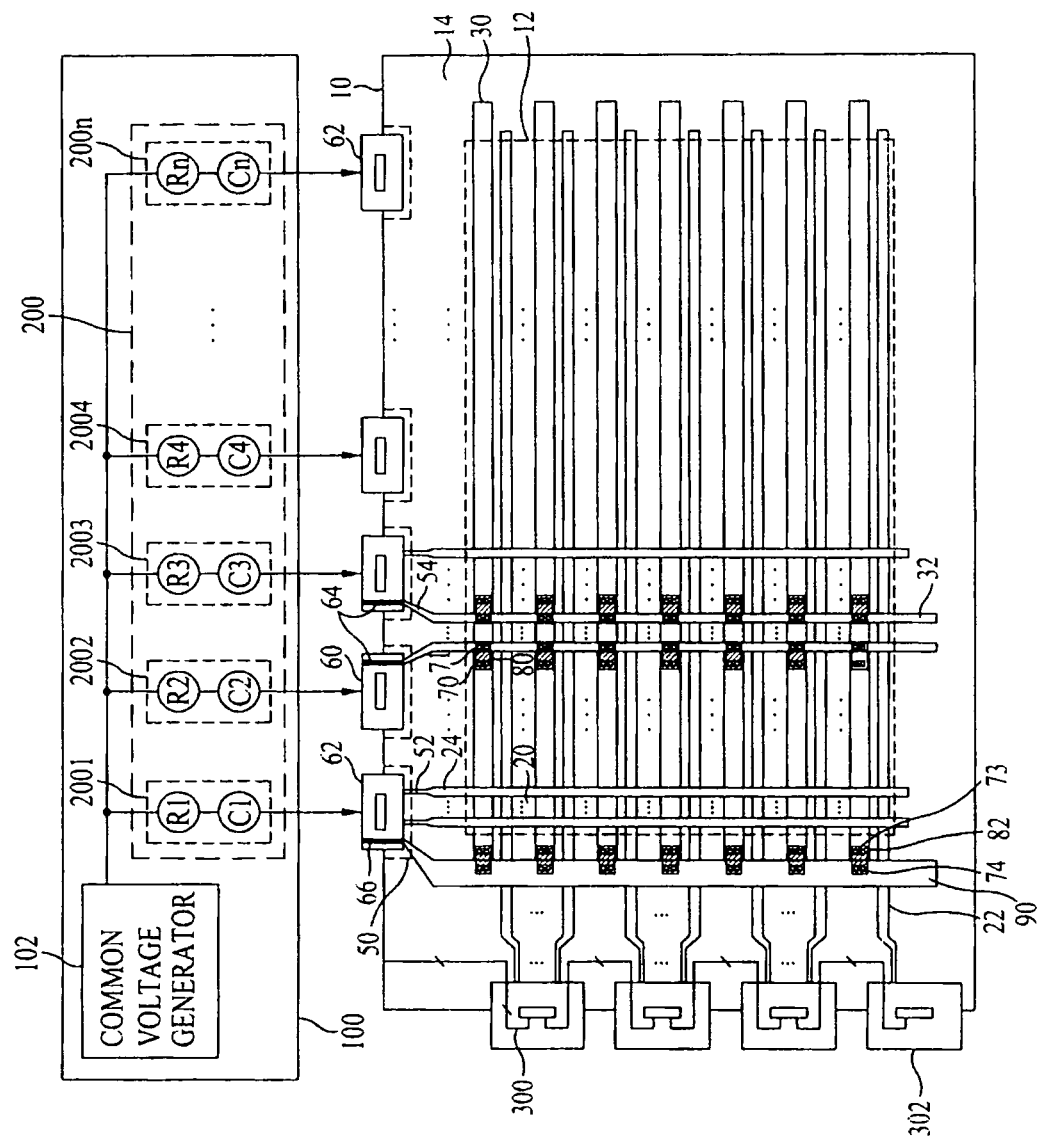
FIG. 19 is a plan view illustrating an exemplary liquid crystal display device according to a thirteenth embodiment of the present invention.

FIG. 19 is a plan view illustrating an exemplary liquid crystal display device according to a thirteenth embodiment of the present invention. As shown in FIG. 19, the liquid crystal display device according to the thirteenth embodiment of the present invention, as compared to the previously described liquid crystal display device according to the seventh embodiment of the present invention shown in FIG. 13, further includes gate driver ICs 302 and a line-on-glass (LOG) type signal line group 300 connected to each gate driver IC 302 formed in the non-display area 14.

The LOG type signal line group 300 is made of a gate metal layer in the same manner as the gate lines 22. A resistance value of the LOG type signal line group 300 is proportional to a line length. Accordingly, a signal delay increases as the LOG type signal line group 300 gets more distant from the PCB. However, as shown in FIG. 19, when the plurality of delay preventing patterns $200_1$ to $200_n$ are provided to correspond to the respective first and second data driver ICs 60 and 62 so as to achieve uniform common voltage supply, improved display quality can be accomplished. The plurality of delay preventing patterns $200_1$ to $200_n$ shown in FIG. 19 have the same functions and effects as described with reference to FIG. 13 and thus, description thereof is not repeated.

Figure 20A:
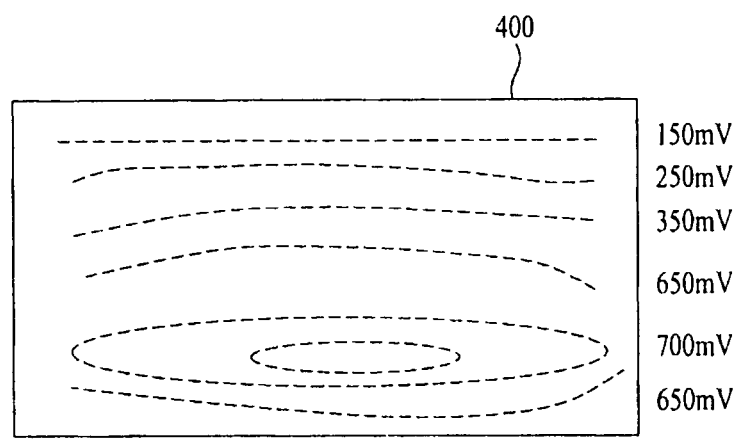
FIG. 20A is a view illustrating common voltage distribution within a display panel of a prior art liquid crystal display device.
Figure 20B:
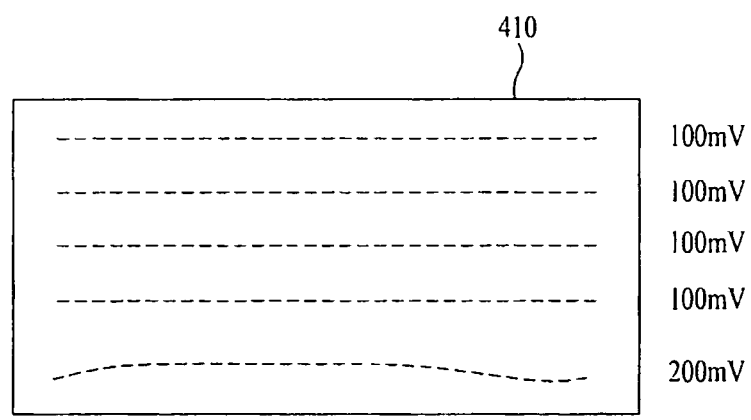
FIG. 20B is a view illustrating common voltage distribution within a display panel of the liquid crystal display device according to the present invention.

FIG. 20A is a view illustrating common voltage distribution within a conventional display panel 400 while FIG. 20B is a view illustrating common voltage distribution in the liquid crystal display device 410 according to the present invention. As shown in FIGS. 20A and 20B, the liquid crystal display device according to the various embodiments of the present invention provides a more uniform distribution of common voltage than the prior art.

In the case of a wide panel 400 having a screen ratio of 16:9 suitable for display of moving images, when a common voltage is supplied only via horizontal common lines parallel to gate lines as in the prior art, the horizontal common lines undergo an increase in resistance because the display panel is lengthened in a gate line direction. Thus, as shown in FIG. 20A, the display panel 400 of the prior art exhibits uneven distribution of the common voltage due to a delay phenomenon depending on RC time constants. However, in the liquid crystal display device 410 according to the various embodiments of the present invention, a common voltage is supplied not only via the horizontal common lines parallel to the gate lines but also via the vertical common lines parallel to the data lines, thereby achieving a remarkable improvement in uniformity of common voltage distribution as shown in FIG. 20B.

Further, the common voltage is provided to the respective data driver ICs, thereby achieving uniform common voltage distribution and preventing a crosstalk phenomenon. In addition, the common lines formed vertically and horizontally in accordance with the present invention prevent wire breakage failure thereof.

It will be apparent to those skilled in the art that various modifications and variations can be made in the liquid crystal display device of the present invention without departing from the spirit or scope of the invention. For example, the first common lines 30 (i.e., the horizontal common lines) may be omitted altogether and only the second common lines 32 (i.e., the vertical common lines) may be used to provide a stable and uniform common voltage across the display panel 10. Thus, it is intended that the present invention cover the modifications and variations of this invention provided they come within the scope of the appended claims and their equivalents.

What is claimed is:

1. A liquid crystal display device comprising:
    a display panel including a display area and a non-display area surrounding the display area;
    a plurality of gate lines and data lines arranged on the display area to intersect each other, so as to define a plurality of pixel regions;
    a plurality of thin-film transistors formed at respective intersections of the gate lines and the data lines;
    a plurality of pixel electrodes formed on the respective pixel regions and connected to the thin film transistors;
    at least one first common line provided between the data lines and arranged parallel to the data lines;
    a plurality of second common lines provided between the gate lines and arranged parallel to the gate lines;
    a plurality of data pad portions on the non-display area, each data pad portion including data pad lines and common pad lines, the common pad lines supplying a common voltage to the at least one first common line and the plurality of second common lines;
    first data driver ICs connected to the respective data pad portions except for data pad portions at each end of the display panel;
    second data driver ICs connected to the data pad portions at each end of the display panel;
    at least one first common voltage input terminal provided in at least one of the first data driver ICs for supplying a common voltage to the at least one first common line via the common pad lines;
    at least one second common voltage input terminal provided in at least one of the second data driver ICs for supplying the common voltage to the plurality of second common lines; and
    at least one first common line connecting pattern for supplying the common voltage from the second common voltage input terminal to the plurality of second common lines,
    wherein the at least one first common line is formed of the same layer as the data lines, and the plurality of second common lines are formed of the same layer as the gate lines, and wherein the data pad lines, the common pad lines, the at least one first common line, and the first common line connecting pattern are formed of the same layer as the data lines.

2. The liquid crystal display device according to claim 1, wherein the at least one first common line is electrically connected to the second common lines.

3. The liquid crystal display device according to claim 2, wherein the at least one first common line and each second common line have a first contact hole and a second contact hole at an intersection thereof, and are electrically connected to each other by a first connecting pattern through the first and second contact holes, the first connecting pattern being formed of the same layer as the pixel electrodes.

4. The liquid crystal display device according to claim 1, wherein each second common line and the first common line connecting pattern are electrically connected to each other by a second connecting pattern through a third contact hole exposing a part of the second common line and a fourth contact hole exposing a part of the first common line connecting pattern, the second connecting pattern being formed of the same layer as the pixel electrodes.

5. The liquid crystal display device according to claim 1, further comprising:
    a second common line connecting pattern provided on the non-display area between the plurality of data pad portions and the display area, and connecting the common pad lines and the at least one first common line to each other.

6. The liquid crystal display device according to claim 5, wherein the plurality of second common lines and the second common line connecting pattern are formed of the same layer as the gate lines.

7. The liquid crystal display device according to claim 5, wherein the at least one first common line and the second common line connecting pattern are electrically connected to each other by a third connecting pattern through a fifth contact hole exposing a part of the at least one first common line and a sixth contact hole exposing a part of the second common line connecting pattern, the third connecting pattern being formed of the same layer as the pixel electrodes, and wherein each common pad line and the second common line connecting pattern are electrically connected to each other by a fourth connecting pattern through a seventh contact hole exposing a part of the common pad line and an eighth contact hole exposing a part of the second common line connecting pattern, the fourth connecting pattern being formed of the same layer as the pixel electrodes.

8. The liquid crystal display device according to claim 5, wherein the second common line connecting pattern includes a plurality of island-shaped second common line connecting patterns, each arranged between the data driver ICs and connected to the common pad lines provided in the two neighboring first driver ICs.

9. The liquid crystal display device according to claim 5, wherein the second common line connecting pattern includes a plurality of island-shaped second common line connecting patterns, at least two island-shaped second common line connecting patterns arranged at each data driver IC and each of the at least two island-shaped second common line connecting patters connecting one common pad line and at least two first common lines.

10. The liquid crystal display device according to claim 5, wherein a semiconductor layer is interposed between the second common line connecting pattern and the data lines at a region where the second common line connecting pattern and each data line overlap each other.

11. The liquid crystal display device according to claim 5, wherein a portion of each data line overlapped with the second common line connecting pattern has a greater line width than a line width of the remaining portion of the data line, and a portion of the second common line connecting pattern overlapped with the data line has a smaller line width than a line width of the remaining portion of the second common line connecting pattern.

12. The liquid crystal display device according to claim 1, further comprising:
a third common line connecting pattern provided in the non-display area at an opposite side of the data pad portions and electrically connecting the second common lines and the first common line connecting pattern.

13. The liquid crystal display device according to claim 12, wherein the third common line connecting pattern has a dual layer structure consisting of a first pattern formed of the same layer as the data lines and a second pattern formed of the same layer as the gate lines and electrically connected to the first pattern.

14. The liquid crystal display device according to claim 1, further comprising:
a common voltage delay restrictor to control the common voltage supplied to the at least one first common line so as to prevent a common voltage delay phenomenon.

15. The liquid crystal display device according to claim 1, further comprising:
a common voltage delay restrictor to control the common voltage supplied to the at least one first common line and the second common lines so as to prevent a common voltage delay phenomenon.

16. The liquid crystal display device according to claim 15, wherein the common voltage delay restrictor includes a plurality of delay preventing patterns, and each delay preventing pattern has at least one resistor and at least one capacitor having different values from those of the other delay preventing patterns.

17. The liquid crystal display device according to claim 16, wherein values of the resistor and the capacitor included in the respective delay preventing patterns decrease as a common voltage delay rate increases.

18. The liquid crystal display device according to claim 16, wherein at least one of the plurality of delay preventing patterns is connected to the respective first data driver ICs to control the common voltage supplied to the respective first data driver ICs.

19. The liquid crystal display device according to claim 16, wherein at least one of the plurality of delay preventing patterns is connected to the respective first and second data driver ICs to control the common voltage supplied to the respective first and second data driver ICs.

* * * * *